(12) United States Patent
Cha et al.

(10) Patent No.: US 11,724,559 B2
(45) Date of Patent: Aug. 15, 2023

(54) WATER-COOLING TYPE BATTERY COOLING SYSTEM AND COOLING METHOD USING THE SAME

(71) Applicants: Hyundai Motor Company, Seoul (KR); Kia Motors Corporation, Seoul (KR)

(72) Inventors: Yong-Woong Cha, Seoul (KR); Jung-Ha Park, Seoul (KR); Joong-Su Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 17/177,817

(22) Filed: Feb. 17, 2021

(65) Prior Publication Data

US 2021/0162836 A1 Jun. 3, 2021

Related U.S. Application Data

(62) Division of application No. 16/205,311, filed on Nov. 30, 2018, now Pat. No. 10,953,722.

(30) Foreign Application Priority Data

Jul. 24, 2018 (KR) .................. 10-2018-0085912

(51) Int. Cl.
 *B60H 1/00* (2006.01)
 *B60H 1/32* (2006.01)
(52) U.S. Cl.
 CPC ..... *B60H 1/00278* (2013.01); *B60H 1/00342* (2013.01); *B60H 1/00485* (2013.01); *B60H 1/323* (2013.01)

(58) Field of Classification Search
 CPC ............... B60H 1/00342; B60H 1/323; B60H 1/00278; B60H 1/00485; F25B 2400/054; F25B 41/345
 See application file for complete search history.

(56) References Cited

U.S. PATENT DOCUMENTS

| | | |
|---|---|---|
| 9,541,682 B2 | 1/2017 | Isojima et al. |
| 2009/0249807 A1 | 10/2009 | Nemesh et al. |
| 2011/0146266 A1 | 6/2011 | Weinbrenner et al. |
| 2012/0297809 A1 | 11/2012 | Carpenter |
| 2013/0061630 A1 | 3/2013 | Schaefer et al. |
| 2015/0362263 A1* | 12/2015 | Wang ............... F25B 41/38 165/100 |
| 2016/0054486 A1 | 2/2016 | Isojima et al. |
| 2017/0088006 A1 | 3/2017 | Blatchley et al. |
| 2017/0158081 A1 | 6/2017 | Kim et al. |
| 2017/0217279 A1 | 8/2017 | Jalilevand et al. |
| 2017/0297407 A1 | 10/2017 | Shan et al. |
| 2017/0313158 A1 | 11/2017 | Porras et al. |

FOREIGN PATENT DOCUMENTS

| | | |
|---|---|---|
| JP | 2016-0046262 A | 4/2016 |
| KR | 10-2016-0046262 A | 4/2016 |

* cited by examiner

*Primary Examiner* — Cassey D Bauer
(74) *Attorney, Agent, or Firm* — Fox Rothschild LLP

(57) ABSTRACT

A water-cooling type battery cooling system and a cooling method using the same are provided. The water-cooling type battery cooling system cools a battery using an air conditioner system. The air conditioner system includes a refrigerant circuit to improve control of cooling discharge temperature provided therein.

11 Claims, 11 Drawing Sheets

WATER-COOLING TYPE BATTERY COOLING SYSTEM AND COOLING METHOD USING THE SAME

CROSS-REFERENCE(S) TO RELATED APPLICATIONS

This application is a Divisional Application of U.S. patent application Ser. No. 16/205,311, filed Nov. 30, 2018, which claims priority to Korean Patent Application No(s). 10-2018-0085912, filed on Jul. 24, 2018, the disclosure of which is incorporated herein by reference in its entirety.

BACKGROUND

Field of the Disclosure

The present disclosure relates to a water-cooling type battery cooling system and a cooling method using the same, and more particularly, to a water-cooling type battery cooling system for cooling a battery using an air conditioner system, which includes a refrigerant circuit for improving control of cooling discharge temperature, and a cooling method using the same.

Description of Related Art

Generally, a water-cooling type battery cooling system for cooling a battery using an air conditioner system has a configuration in which a refrigerant circuit of an air conditioner system is connected to a chiller. FIG. 1 illustrates an air conditioner system in which a conventional water-cooling type battery cooling system is provided, according to the related art, and FIG. 2 illustrates the conventional water-cooling type battery cooling system according to the related art.

In particular, the system shown in FIGS. 1 and 2 show insufficient space in an engine compartment and deterioration of the assembly ability caused by an increase of electrical parts due to the complex refrigerant circuit branch structure. Additionally, cost, weight and the like are increased in such systems. When a refrigerant of the air conditioner system is supplied to a chiller for cooling a battery during operation of the air conditioner for cooling a vehicle indoor space, an indoor vent discharge temperature increases due to deterioration of the flow amount distribution of the refrigerant, thereby deteriorating the comfort. Therefore, it may be difficult to control a cooling discharge temperature thus leading to deterioration of indoor space cooling performance.

SUMMARY

The present disclosure optimizes an internal space in an engine compartment by integrating a refrigerant circuit of an air conditioner system for cooling an indoor space and a refrigerant circuit for a chiller which is branched from the refrigerant circuit of the air conditioner system and further connected for cooling the battery. In addition, an object of the present disclosure is to prevent sudden change in a flow amount distribution of a refrigerant, when a battery is cooled.

In order to achieve the above objects, a water-cooling type battery cooling system according to the present disclosure may include a compressor into which a refrigerant in an evaporator may flow through a suction pipe directly connected to the compressor, a chiller configured to cool a battery and a thermostatic expansion valve for the chiller may be mounted on a certain longitudinal portion of the suction pipe to allow an internal refrigerant of the suction pipe discharged from the evaporator to pass sequentially through the thermostatic expansion valve for the chiller and the chiller and to subsequently flow into the compressor along the suction pipe, and the refrigerant discharged from the condenser may flow in a liquid pipe having a first end connected to the condenser and a second end connected to the suction pipe between the thermostatic expansion valve for the chiller and the evaporator.

The chiller may include a chiller suction inlet port into which the internal refrigerant of the suction pipe may flow, a chiller liquid inlet port into which an internal refrigerant of the liquid pipe may flow, and a refrigerant outlet port through which an internal refrigerant of the chiller entered through the chiller suction inlet port and the chiller liquid inlet port may be discharged. The chiller suction inlet port and the refrigerant outlet port may be coaxially formed to each other. The thermostatic expansion valve for the chiller may include a valve suction inlet port into which the internal refrigerant of the suction pipe may flow, and a valve liquid inlet port into which the internal refrigerant of the liquid pipe may flow. In particular, the valve suction inlet port may be in communication with the chiller suction inlet port, and the valve liquid inlet port may be in communication with the chiller liquid inlet port.

The liquid pipe may be in communication with the valve liquid inlet port at a certain longitudinal portion thereof. The thermostatic expansion valve for the chiller may include a solenoid valve mounted therein and configured to open or close the valve liquid inlet port. The solenoid valve may have an orifice aperture formed therein. The solenoid valve may be changed to an opened state when a turn-on signal is transmitted to the chiller and may be changed to a closed state when the turn-off signal is transmitted to the chiller. When the turn-off signal is transmitted to the chiller, the internal refrigerant of the liquid pipe may flow towards the suction pipe connected to the second end of the liquid pipe.

As the solenoid valve is opened when the turn-on signal is transmitted to the chiller, the internal refrigerant of the liquid pipe may be divided, and some of the divided refrigerant may flow towards the valve liquid inlet port and flow into the chiller. When the turn-on signal is transmitted to the chiller, the internal refrigerant of the liquid pipe flowing into the chiller may be circulated in the chiller and heat-exchanged to cool coolant for a battery in the chiller. The chiller may include a partition installed therein to close a space between the chiller suction inlet port and the refrigerant outlet port.

The internal refrigerant of the suction pipe flowing into the chiller via the chiller suction inlet port may be circulated in the chiller and heat-exchanged to cool coolant for a battery in the chiller. The chiller may include a coolant inlet port and a coolant outlet port formed therein. When the turn-on signal is transmitted to the chiller, coolant for a battery may flow into the coolant inlet port and may be discharged from the coolant outlet port.

According to another aspect of the present disclosure, a cooling method using the water-cooling type battery cooling system according to the present disclosure may include transmitting a turn-on signal to a chiller for cooling a battery; opening a valve liquid inlet port by operation of a solenoid valve mounted in a thermostatic expansion valve for the chiller; dividing an internal refrigerant of a liquid pipe to allow some of divided refrigerant to be directed towards the valve liquid inlet port and to flow into the chiller; circulating the internal refrigerant of the liquid pipe flowing into the chiller to be heat-exchanged and to cool coolant for the battery in the chiller; and discharging the internal refrigerant of the liquid pipe, which has cooled coolant for the battery in the chiller, via a refrigerant discharge port.

Prior to transmitting the turn-on signal to the chiller and up to the discharging of the internal refrigerant of the liquid pipe to the outside of the chiller via the refrigerant outlet port, the internal refrigerant of the suction pipe, which passes sequentially through the chiller suction inlet port and the refrigerant outlet port, may flow into the chiller. Additionally, prior to transmitting the turn-on signal to the chiller, the valve liquid inlet port may be in a closed state by the solenoid valve.

Prior to opening the valve liquid inlet port, the internal refrigerant of the liquid pipe discharged from a condenser may flow towards the suction pipe connected to the second end of the liquid pipe. In discharging of the internal refrigerant of the liquid pipe to the outside of the chiller via the refrigerant outlet port, the internal refrigerant of the liquid pipe may be coalesced with the internal refrigerant of the suction pipe in the chiller and may be then discharged to the outside of the chiller. The internal refrigerant of the liquid pipe discharged to the outside of the chiller may flow into a compressor.

According to the present disclosure, by integrating the refrigerant circuit of the air conditioner system and the refrigerant circuit for the chiller, the structure may be simplified compared to the existing system, and thus the internal space of the engine compartment may be optimized. Further, the cost and weight may be reduced and the assembly ability may be improved. In addition, it may be possible to solve the problem caused by a sudden change in the flow amount distribution of the refrigerant, which has been a problem in cooling the battery in the conventional air conditioner system, thereby improving the indoor comfort and satisfaction by securing a stability of the indoor vent discharge temperature control.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
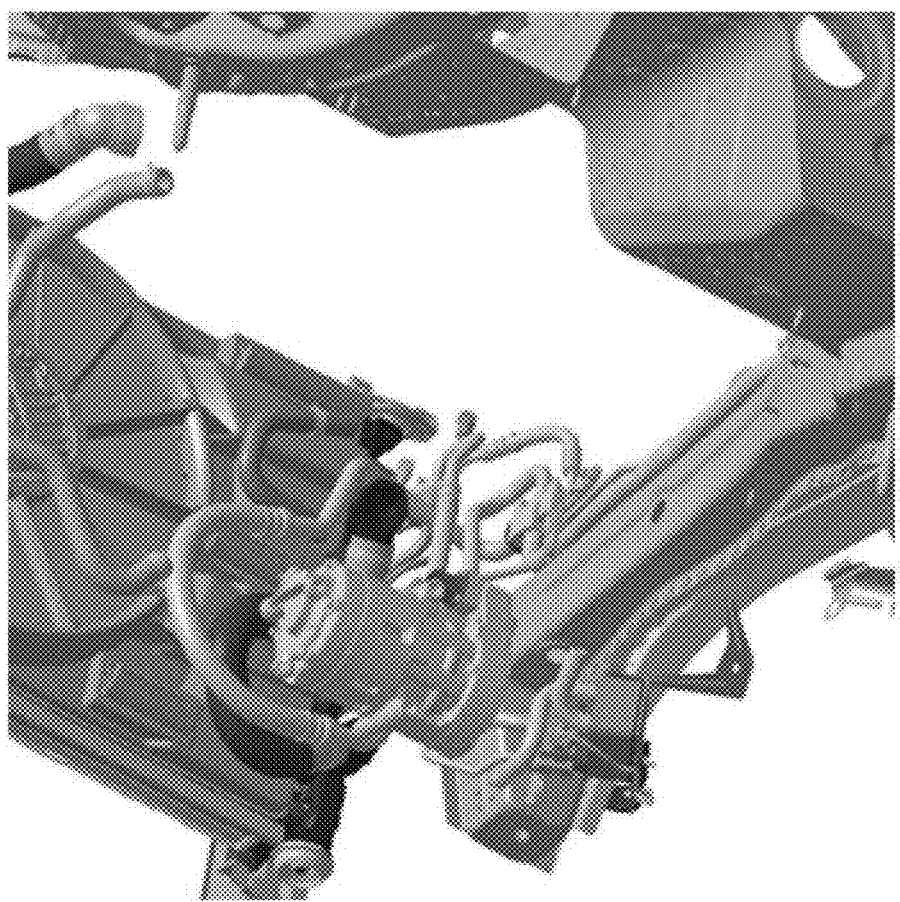
FIG. 1 is a view showing an air conditioner system in which a conventional water-cooling type battery cooling system is provided according to the related art.
Figure 2:
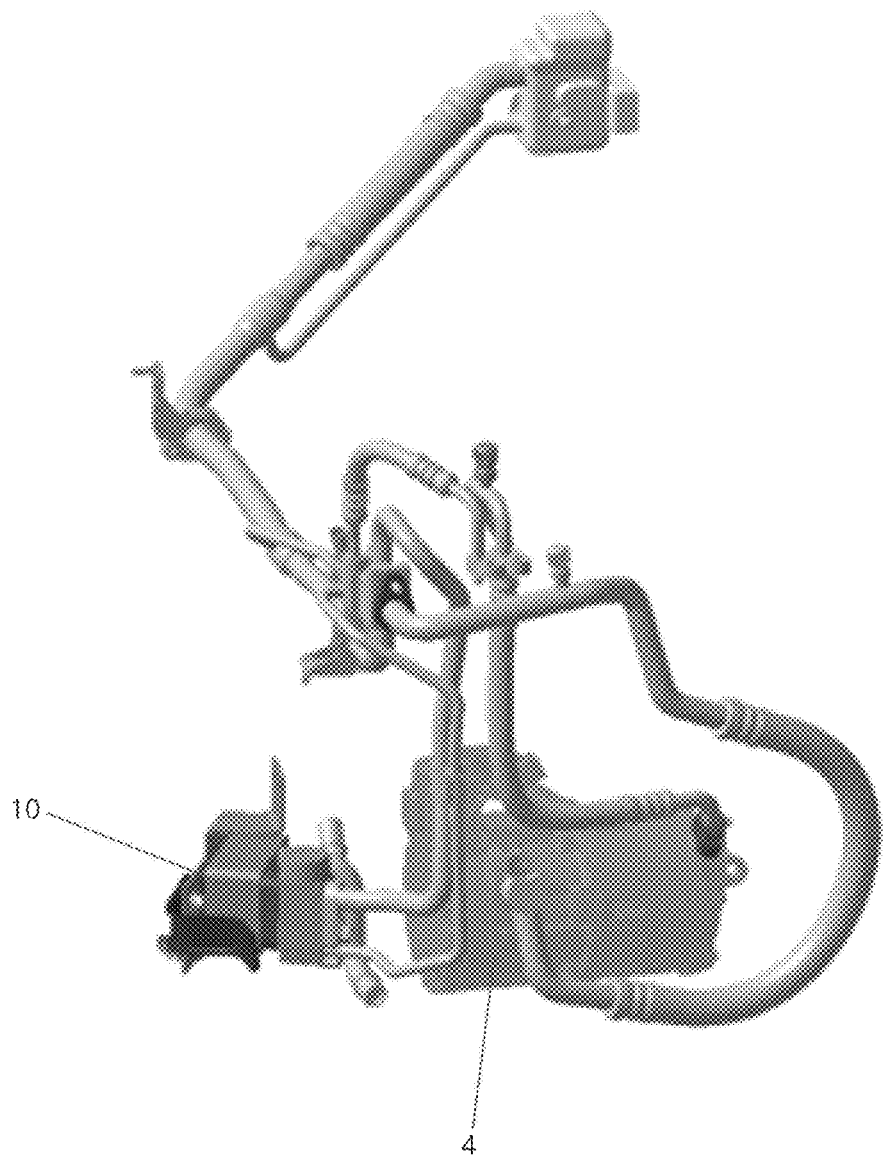
FIG. 2 is a view showing the conventional water-cooling type battery cooling system according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In order to fully understand the present disclosure, exemplary embodiments of the present disclosure will be described with reference to the accompanying drawings. The exemplary embodiments of the present disclosure may be modified in various forms, and the scope of the present disclosure should not be construed as being limited to the exemplary embodiments described in detail below. The present exemplary embodiments are provided to enable those ordinary skilled in the art to more fully understand the present disclosure. Therefore, shapes and the like of elements in the drawings may be exaggerated in order to emphasize clearer explanation. It should be noted that the same elements in the drawings are denoted by the same reference numeral. Detailed descriptions on well-known functions and configurations that may unnecessarily obscure the gist of the present disclosure will be omitted.

The present disclosure relates to a water-cooling type battery cooling system and a cooling method using the same, and more particularly, to a cooling system, in which a refrigerant circuit for enhancing cooling and discharge temperature control is provided, in a water-cooling battery cooling system for cooling a battery using an air conditioner system, and a cooling method using the same.

Figure 3:
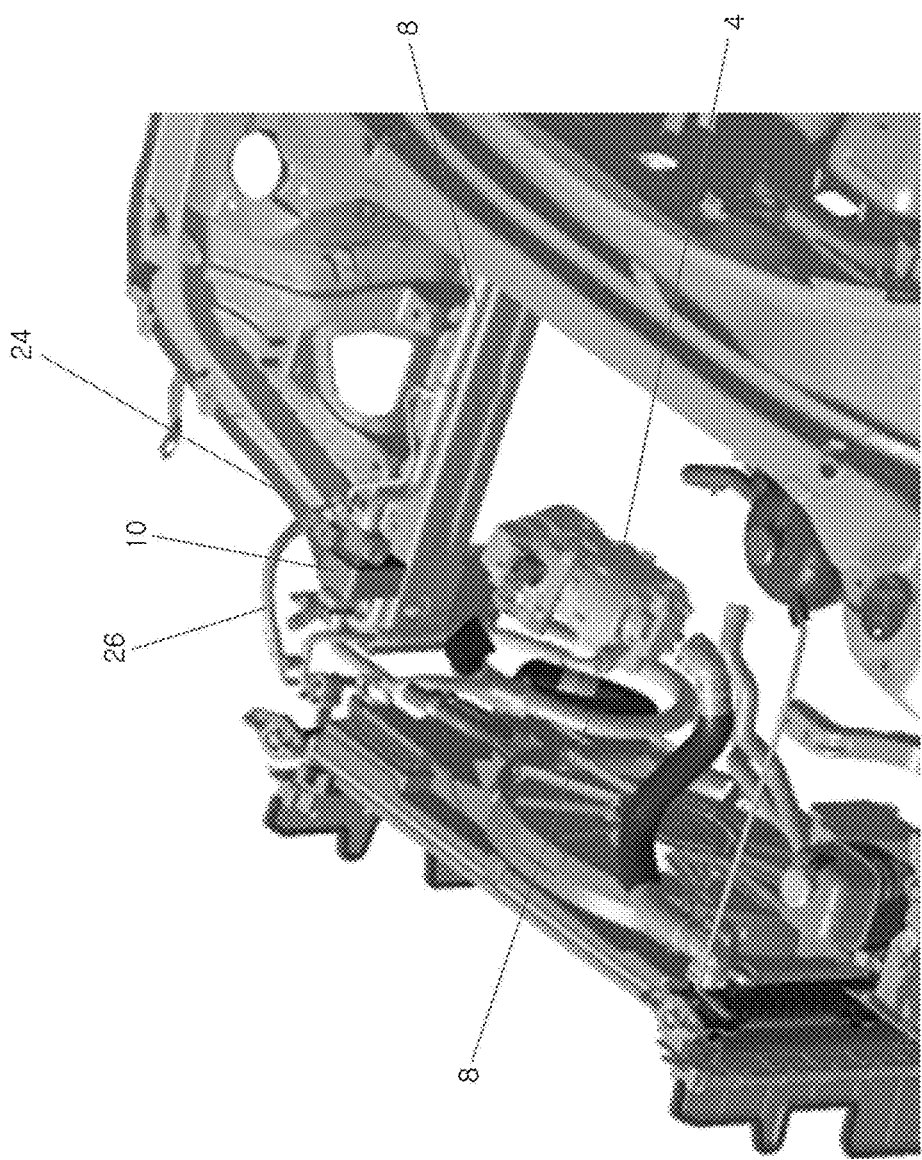
FIG. 3 is a view showing an air conditioner system in which a water-cooling type battery cooling system according to an exemplary embodiment of the present disclosure is provided.
Figure 4:
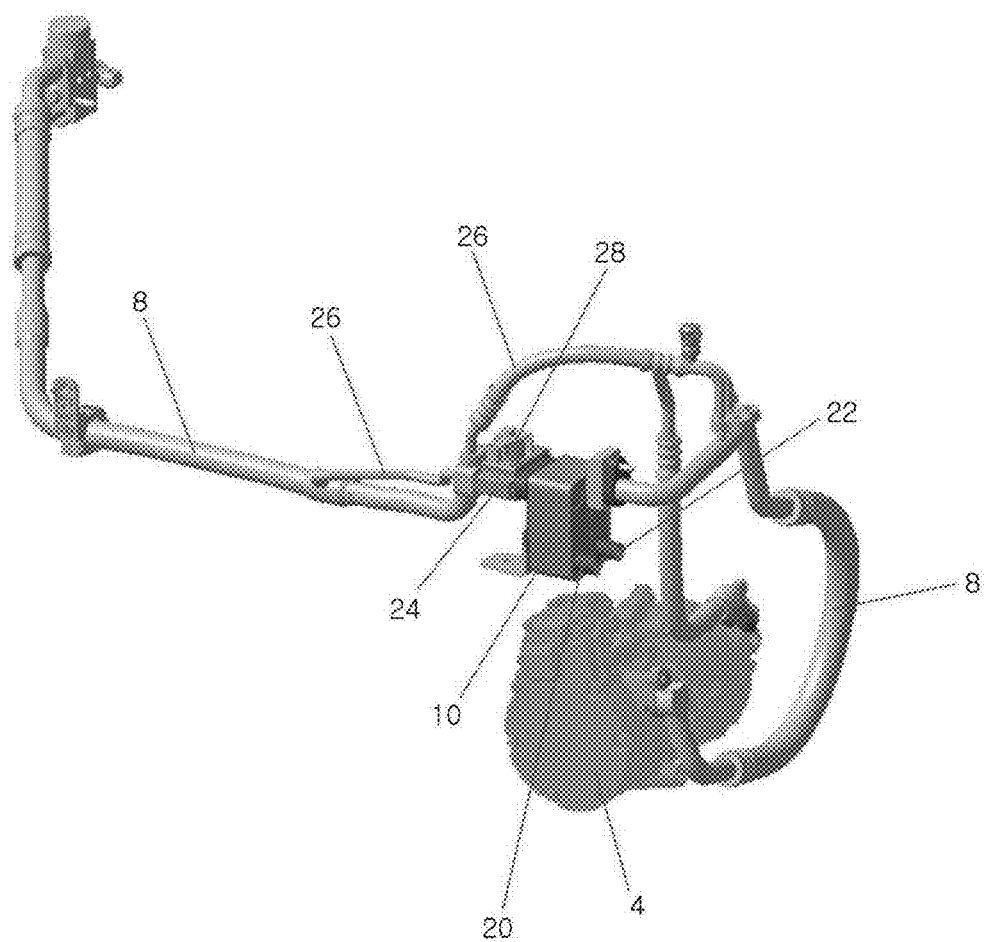
FIG. 4 is a view showing the water-cooling type battery cooling system according to an exemplary embodiment of the present disclosure.

In FIG. 3, an air conditioner system in which a water-cooling type battery cooling system according to the present disclosure is provided is illustrated. The water-cooling type battery cooling system of the present disclosure for cooling coolant using a refrigerant of an air conditioner system may include an evaporator 2, a compressor 4 and a condenser 6 having a refrigerant circuit of the air conditioner system to cool a vehicle indoor space and a refrigerant circuit for a chiller to cool a battery, which are integrally formed with each other.

The water-cooling type battery cooling system may further include a liquid pipe 26 together with a chiller 10 to which a suction pipe 8 separated from a battery coolant line may be connected. In particular, a refrigerant of the air conditioner system may flow from the evaporator 2 to the compressor through the suction pipe. A refrigerant discharged from the condenser 6 may flow in the liquid pipe 26, and this refrigerant may be discharged from the condenser 6 and flow in the liquid pipe 26, and the liquid pipe 26 may divide the flow amount of refrigerant into the flow amount of refrigerant entering the compressor 4 via the chiller 10 and the flow amount of refrigerant entering the evaporator 2 without passing through the chiller 10.

Specifically, in the water-cooling type battery cooling system of the present disclosure, the evaporator 2 and the compressor 4 may be connected to each other via the suction pipe 8 directly connected thereto, and an internal refrigerant of the evaporator 2 may flow into the compressor 4 through the suction pipe 8. The chiller 10 for cooling a battery and a thermostatic expansion valve 24 for the chiller may be mounted on a particular longitudinal portion of the suction pipe 8. The suction piping 8 may be in communication with the chiller 10 and the thermostatic expansion valve 24 for the chiller. An internal refrigerant of the suction pipe 8 discharged from the evaporator 2 may pass through sequentially the thermostatic expansion valve 24 for the chiller and the chiller 10, and subsequently may flow into the compressor 4 along the suction pipe 8.

A first end of the liquid pipe 26 may be connected to the condenser 6 and a second end of the liquid pipe 26 may be connected to the suction pipe 8. A location where the liquid pipe 26 is connected to the suction 8 may be between the thermostatic expansion valve 24 for the chiller and the evaporator 2. The refrigerant discharged from the condenser 6 may flow along the liquid pipe 26 and flow into the suction pipe 8. An internal refrigerant of the liquid pipe 26 flowing into the suction pipe 8 may be coalesced with the internal refrigerant of the suction pipe 8.

The chiller 10 for cooling the battery may include a chiller suction inlet port 12 into which the internal refrigerant of the suction pipe 8 may flow, a chiller liquid inlet port 14 into which the internal refrigerant of the liquid pipe 26 may flow, and a refrigerant outlet port 16 through which an internal refrigerant of the chiller 10 entered through the chiller suction inlet port 12 and the chiller liquid inlet port 14 may be discharged. The chiller suction inlet port 12 and the refrigerant outlet out 16 may be coaxially formed with each other, and the refrigerant outlet port 16 may be connected to the suction pipe 8 that extends toward the compressor 4.

In addition, a coolant inlet port 20 and a coolant outlet port 22 may be formed in the chiller 10. Particularly, when a turn-on signal is transmitted to the chiller 10, coolant for cooling the battery may flow into the coolant inlet port 20 and may be discharged from the coolant outlet port 22. The thermal expansion valve 24 for the chiller may include a valve suction inlet port (not shown) into which the internal refrigerant of the suction pipe 8 may flow and a valve liquid inlet port (not shown) into which the internal refrigerant of the liquid pipe 26 may flow. The valve suction inlet port may be in communication with and coaxially formed with the chiller suction inlet port 12, and the valve liquid inlet port may be in communication with and coaxially formed with the chiller liquid inlet port 14.

The valve suction inlet port may be connected to the suction pipe 8 that extends from the evaporator 2. The liquid pipe 26 may be formed to be in communication with the valve liquid inlet port at a particular longitudinal portion thereof. A solenoid valve 28 may provide communication between the liquid pipe 26 and the valve liquid inlet port. In particular, the solenoid valve 28 may be mounted in the thermostatic expansion valve 24 for the chiller, and the valve liquid inlet port may be opened or closed by operation of the solenoid valve 28 to control a communication between the liquid pipe 26 and the valve liquid inlet port. The solenoid valve 28 in which an orifice aperture is formed may be changed to an opened state when the turn-on signal is transmitted to the chiller 10, and may be changed to a closed state when a turn-off signal is transmitted to the chiller 10.

Figure 5:
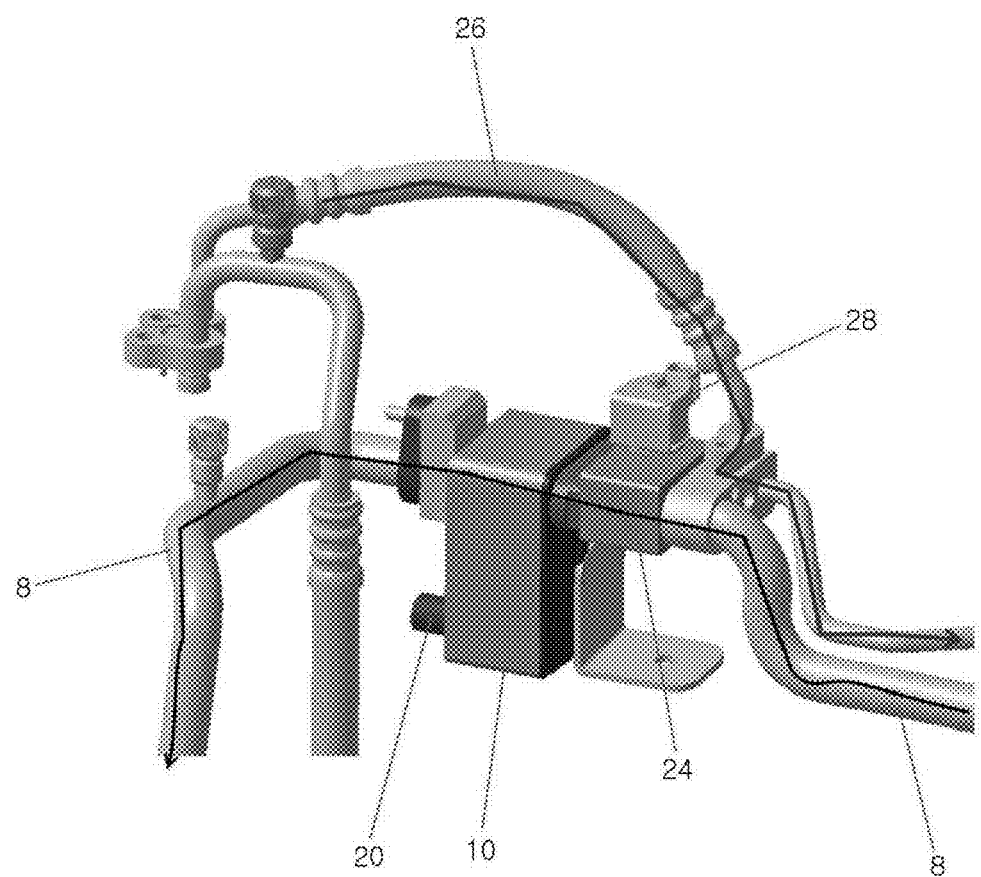
FIG. 5 is a view illustrating a refrigerant circulating configuration in a refrigerant circuit for a chiller when a chiller is turned-off according to an exemplary embodiment of the present disclosure.
Figure 6:
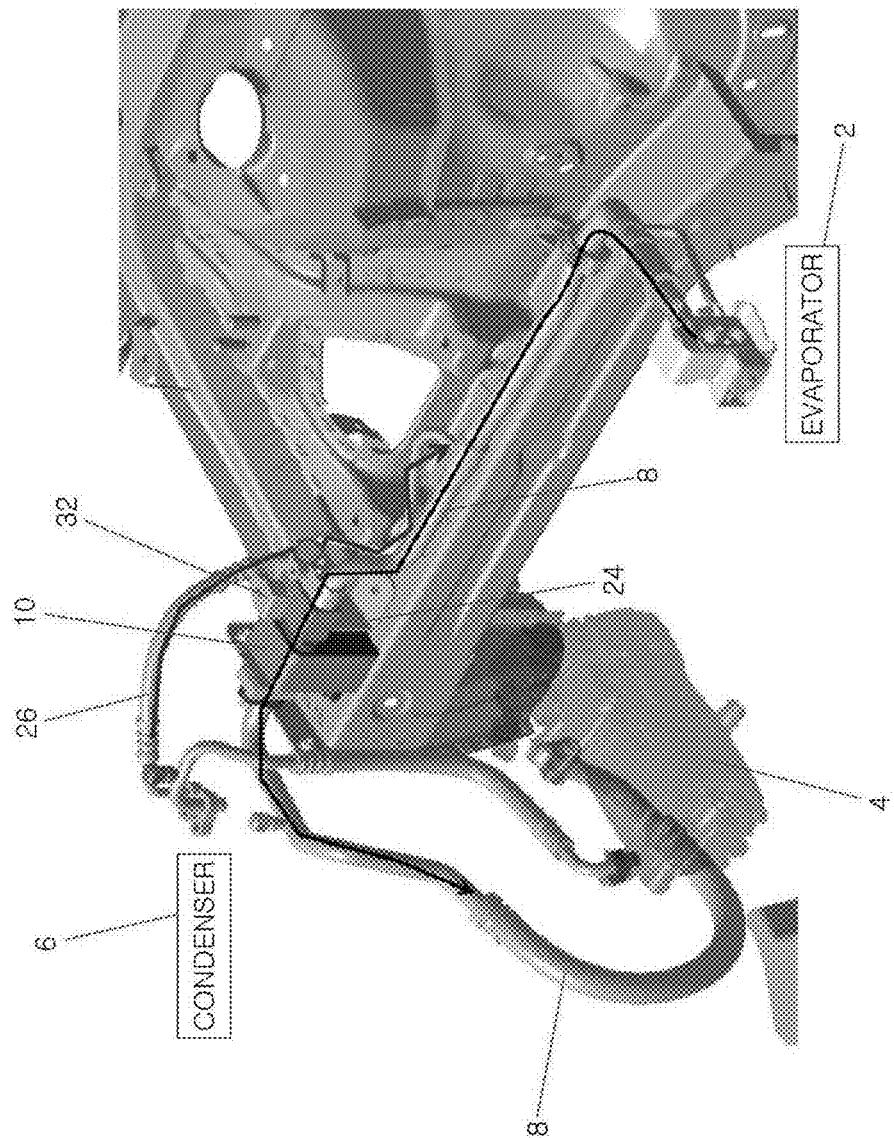
FIG. 6 is a conceptual view of an entire system illustrated in FIG. 5 according to an exemplary embodiment of the present disclosure.

FIG. 5 is a view illustrating a refrigerant circulating configuration in a refrigerant circuit for the chiller when the chiller is turned-off, and FIG. 6 illustrates a conceptual view of an entire system illustrated in FIG. 5. When the turn-off signal is transmitted to the chiller 10, the solenoid valve 28 may be maintained in a closed state, and thus, the liquid pipe 26 is not in communication with the valve liquid inlet port. Accordingly, the internal refrigerant of the liquid pipe 26 is not divided and does not flow into the valve liquid inlet port side, and thus may flow towards the suction pipe 8 connected to the second end of the liquid pipe 26. At this time, a double pipe structure of the suction pipe 8 allows the refrigerant discharged from the liquid pipe 26 to flow towards the evaporator 2 without being mixed with the flow of refrigerant flowing from the evaporator 2 to the compressor 4.

Figure 7:
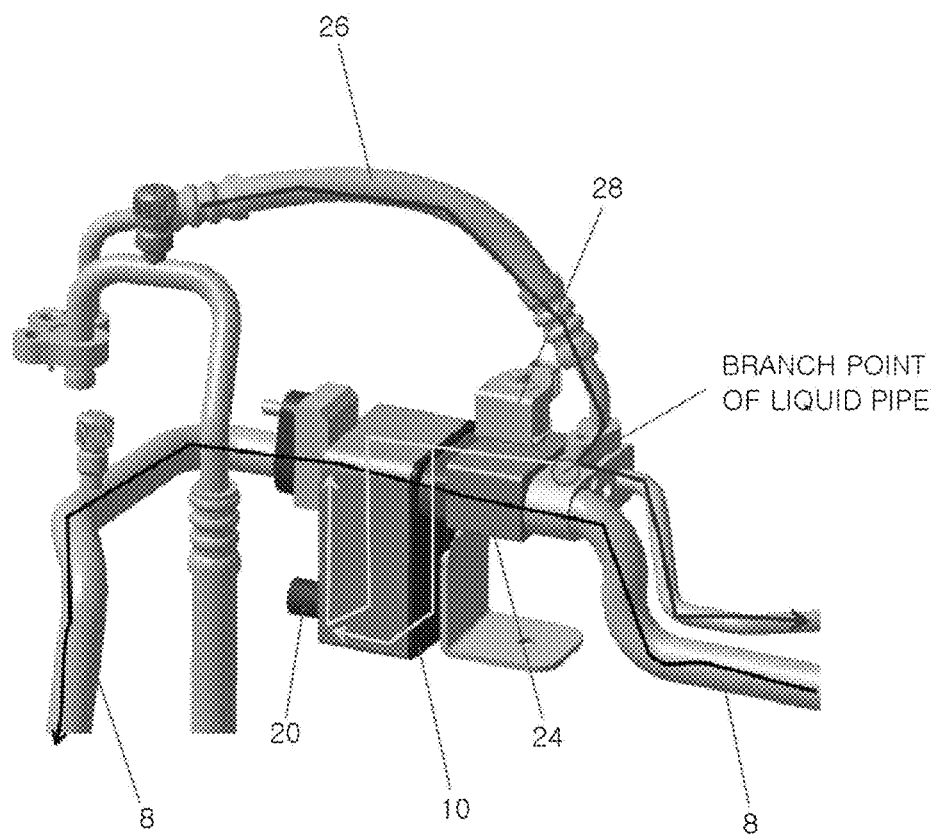
FIG. 7 is a view illustrating the refrigerant circulating configuration in the refrigerant circuit for the chiller when the chiller is turned-on according to an exemplary embodiment of the present disclosure.
Figure 8:
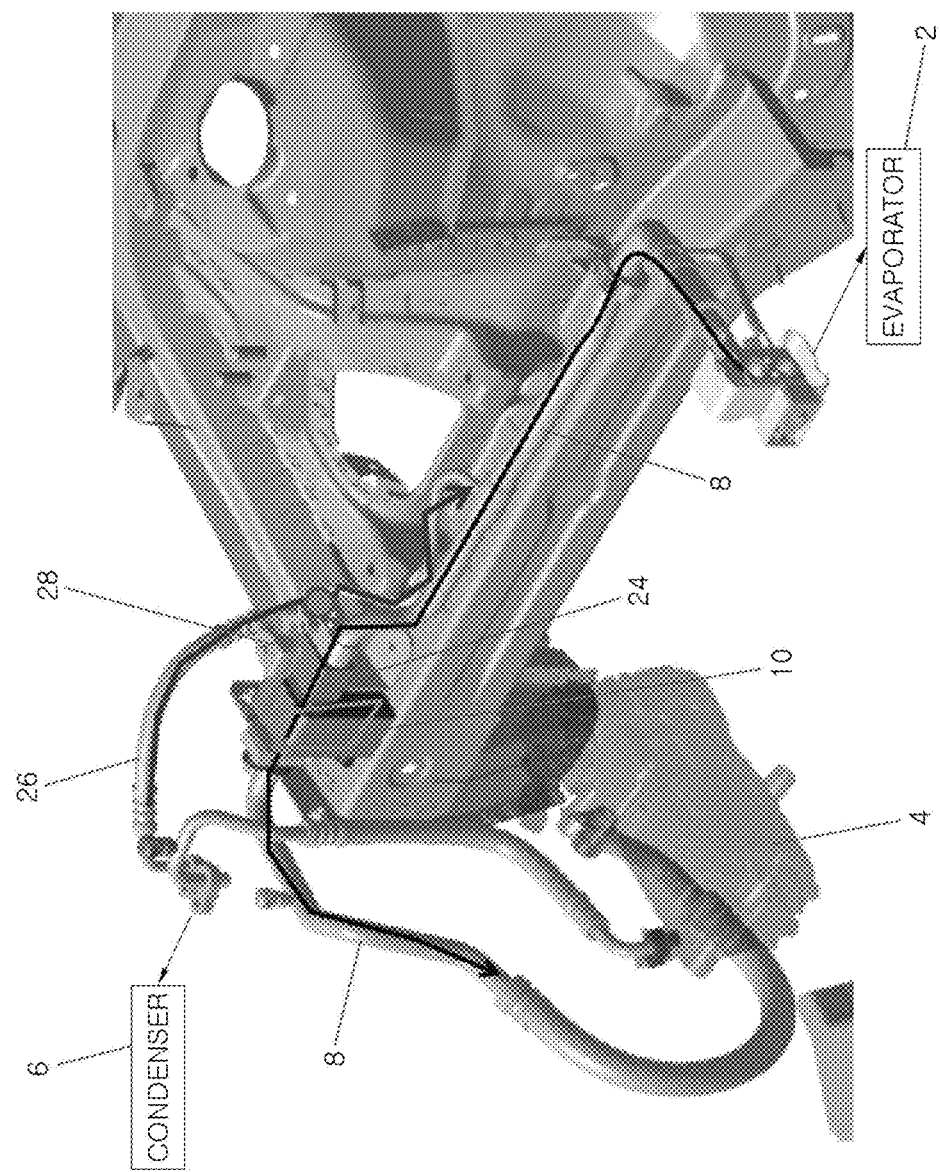
FIG. 8 is a conceptual view of an entire system illustrated in FIG. 7 according to an exemplary embodiment of the present disclosure.

FIG. 7 is a view illustrating the refrigerant circulating configuration in the refrigerant circuit for the chiller when the chiller is turned-on, and FIG. 8 is a conceptual view of an entire system illustrated in FIG. 7. As the solenoid valve 28 is opened when the turn-on signal is transmitted to the chiller 10, the liquid pipe 26 is in communication with the valve liquid inlet port. Accordingly, the internal refrigerant of the liquid pipe 26 may be divided, a first portion of divided refrigerant may flow into the chiller 10 via the valve liquid inlet port and the chiller liquid inlet port 14, and a second portion of divided refrigerant may flow towards the suction pipe 8 connected to the second end of the liquid pipe 26.

Figure 9:
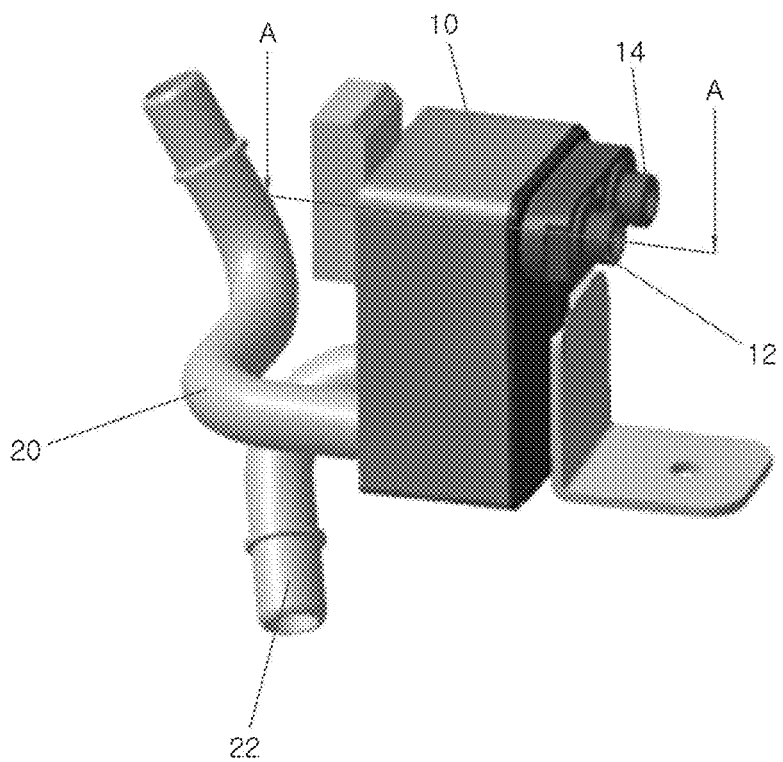
FIG. 9 is a structural view of the chiller according to an exemplary embodiment of the present disclosure.
Figure 10:
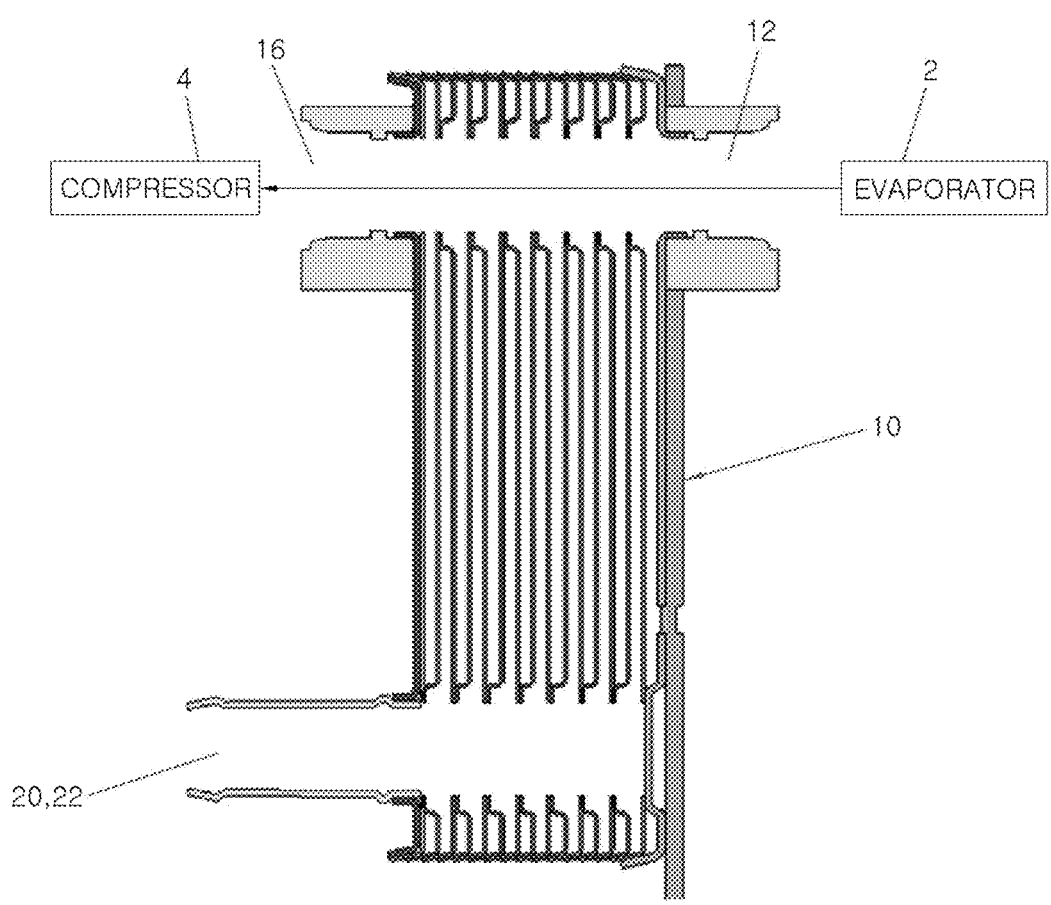
FIG. 10 shows the chiller according to a first exemplary embodiment of the present disclosure and is a cross-sectional view taken along line A-A of FIG. 9.

FIG. 9 shows a structural view of the chiller of the present disclosure, and FIG. 10 shows the chiller according to a first exemplary embodiment of the present disclosure and is a cross-sectional view taken along line A-A of FIG. 9. When the chiller 10 of the present disclosure has a cross section as illustrated in FIG. 10, the internal refrigerant of the suction pipe 8 flowing into the chiller 10 through the chiller suction inlet port 12 is not circulated in the chiller 10, but may be discharged into the suction pipe 8, connected to the compressor 4, through the refrigerant outlet port 16. At this time, when the turn-on signal is transmitted to the chiller 10, the internal refrigerant of the liquid pipe 26 flowing into the chiller 10 through the chiller liquid inlet port 14 may be circulated in the chiller 10 and heat-exchanged to cool coolant for the battery in the chiller 10.

Figure 11:
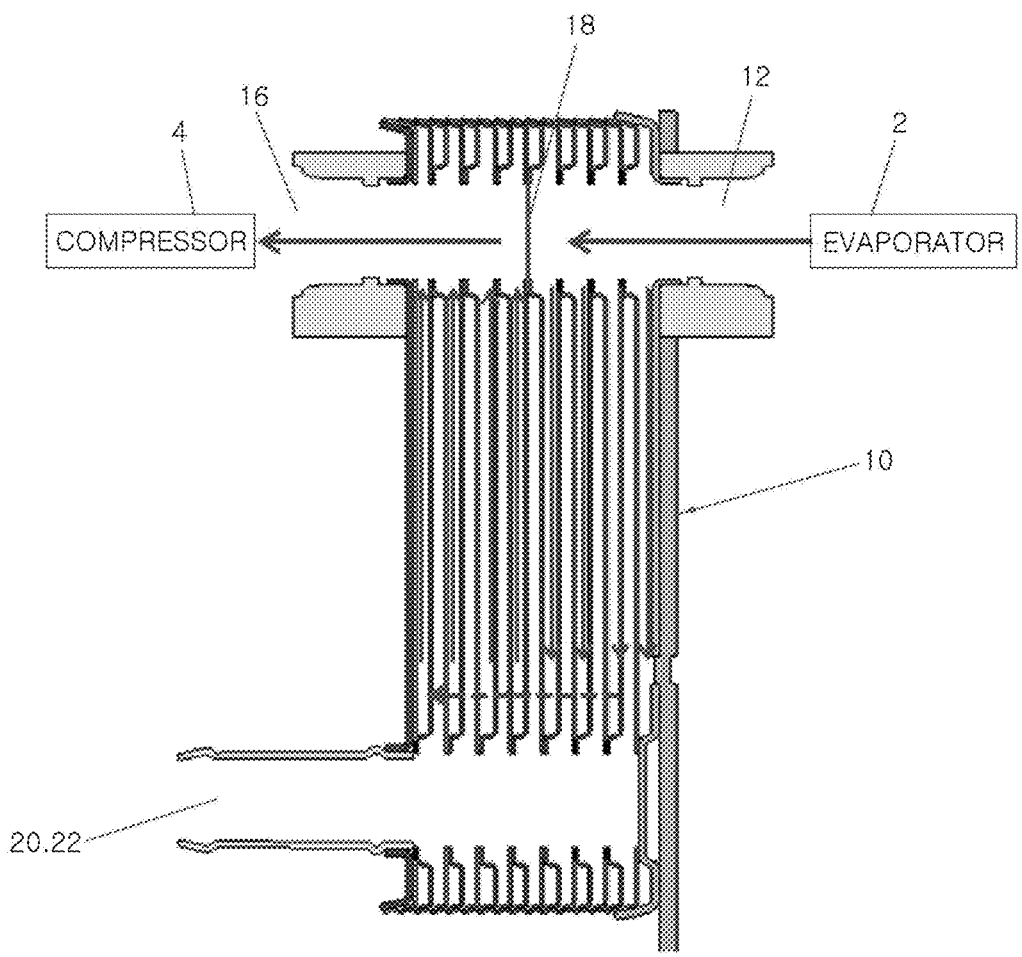
FIG. 11 shows the chiller according to a second exemplary embodiment of the present disclosure and is a cross-sectional view taken along line A-A of FIG. 9.

FIG. 11 shows the chiller according to a second exemplary embodiment of the present disclosure and is a cross-sectional view taken along line A-A of FIG. 9. When a partition 18 that closes a space between the chiller suction inlet port 12 and the refrigerant outlet port 16 is provided in the chiller 10 of the present disclosure as illustrated in FIG. 11, the internal refrigerant of the suction pipe 8 flowing into the chiller 10 through the chiller suction inlet port 12 is not directly discharged through the refrigerant outlet port 16, but may be circulated in the chiller 10 and heat-exchanged to cool coolant for the battery in the chiller 10. When the turn-on signal is transmitted to the chiller 10, the internal refrigerant of the liquid pipe 26 flowing into the chiller 10 through the chiller liquid inlet port 14 may be coalesced with the internal refrigerant of the suction pipe 8 in the chiller 10, and may be circulated in the chiller 10 and heat-exchanged to cool coolant for the battery in the chiller 10.

The cooling method using the water-cooling type battery cooling system of the present disclosure configured as described above disclosure may include transmitting a turn-on signal to the chiller 10 for cooling the battery; operating the solenoid valve 28 mounted in the thermostatic expansion valve 24 for the chiller to open the valve liquid inlet port; dividing the internal refrigerant of the liquid pipe 26 to allow a first portion of divided refrigerant to be directed towards the valve liquid inlet port and to flow into the chiller; circulating the internal refrigerant of the liquid pipe 26 flowing into the chiller 20 to be heat-exchanged and to cool coolant for the battery in the chiller 10; and discharging the internal refrigerant of the liquid pipe 26, which has cooled coolant for the battery in the chiller 10, via the refrigerant discharge port 16.

Before the turn-on signal is transmitted to the chiller 10, the valve liquid inlet port may be maintained in a closed state by the solenoid valve 28, and the internal refrigerant of the liquid pipe 26 discharged from the condenser 6 may flow towards the suction pipe 8 connected to the second end of the liquid pipe 26. When the turn-on signal is transmitted to the chiller 10 to cool the battery, the solenoid valve 28 may be operated to allow the valve liquid inlet port to be in communication with the liquid pipe 26.

As the valve liquid inlet port becomes in communication with the liquid pipe 26, the internal refrigerant of the liquid pipe 26 may be divided, and thus, some of the divided refrigerant may flow towards the valve liquid inlet port and into the chiller 10, and some other refrigerant may flow towards the suction pipe 8. The internal refrigerant of the liquid pipe 26 flowing into the chiller 10 may be circulated in the chiller 10 and heat-exchanged to cool coolant for cooling the battery in the chiller 10. This refrigerant may then be discharged to the outside of the chiller 10 via the refrigerant outlet port 16.

From before the transmitting of the turn-on signal to the chiller 10 and up to the discharging of the internal refrigerant of the liquid pipe 26 to the outside of the chiller 10 via the refrigerant outlet port 16, the internal refrigerant of the suction pipe 8, which passes sequentially through the chiller suction inlet port 12 and the refrigerant outlet port 16, may flow into the chiller 10. In the discharging of the internal refrigerant of the liquid pipe 26 to the outside of the chiller 10 via the refrigerant outlet port 16, the internal refrigerant of the liquid pipe 26 may be coalesced with the internal refrigerant of the suction pipe 8 in the chiller 10 and then may be discharged to the outside of the chiller 10, and the internal refrigerant of the liquid pipe 26 discharged to the outside of the chiller 10 may flow into the compressor 4.

Since the internal refrigerant of the suction pipe 8 always passes through the inside of the chiller 10 regardless whether the chiller 10 is turned-on or turned-off, when the battery cooling condition is in a mild state, it may be possible to cool the battery using the internal refrigerant of the suction pipe 8 without dividing the internal refrigerant of the liquid pipe 26 and flowing into the chiller 10. Therefore, it may be possible to prevent a problem in which indoor space cooling performance is deteriorated due to a sudden change in the flow amount distribution of the refrigerant, which has been a problem in the air conditioner system in which the internal refrigerant of the existing liquid pipe is divided to cool the battery.

In addition, by integrally forming the refrigerant circuit of the existing air conditioner system for cooling the vehicle indoor space cooling with the refrigerant circuit for the chiller, which has been branched from the refrigerant circuit of the air conditioner system and further connected for cooling the battery, the structure of the system may be simplified to optimize the inner space of an engine compartment, thereby reducing the cost and weight, and improving the ability to be assembled.

The exemplary embodiments of the water-cooling type battery cooling system and the cooling method using the same of the present disclosure described above are merely illustrative, and those ordinary skilled in the art to which the present disclosure may well-know that that various modifications and equivalent other exemplary embodiments may be made from the above embodiments. Therefore, it may be well understood that the present disclosure is not limited to only the form set forth in the foregoing description. Accordingly, the true scope of the present disclosure should be determined by the technical spirit of the appended claims. In addition, it is should be understood that the present disclosure includes all modifications, equivalents, and substitutes falling within the spirit and scope of the present disclosure defined by the appended claims.

What is claimed is:

1. A cooling method using a water-cooling type battery cooling system, comprising:
maintaining, by a controller, a valve liquid inlet port in a thermostatic expansion valve for a chiller in a closed state, and
transmitting, by the controller, a turn-on signal to the chiller configured to cool a battery;

wherein the turn-on signal open the valve liquid inlet port by operation of a thermostatic expansion valve mounted in the thermostatic expansion valve for the chiller;

wherein opening the valve liquid inlet port of the solenoid valve divides an internal refrigerant of a liquid pipe to allow a first portion of divided refrigerant to be directed towards the valve liquid inlet port and to flow into the chiller circulates the internal refrigerant of the liquid pipe flowing into the chiller to be heat-exchanged and to cool coolant for the battery in the chiller, and discharges the internal refrigerant of the liquid pipe, which has cooled coolant for the battery in the chiller, via a refrigerant discharge port, wherein, when the valve liquid inlet port is maintained in the closed state, the internal refrigerant of the liquid pipe discharged from the condenser flows toward a suction pipe, and passes through the chiller, regardless of the turned-on or turned-off signal to the chiller, to cool the battery.

2. The cooling method using the water-cooling type battery cooling system of claim 1, wherein from before transmitting the turn-on signal to the chiller and up to discharging the internal refrigerant of the liquid pipe to the outside of the chiller via the refrigerant discharge port, the internal refrigerant of the suction pipe, which passes sequentially through the valve liquid inlet port and the refrigerant discharge port, flows into the chiller.

3. The cooling method using the water-cooling type battery cooling system of claim 1, wherein before transmitting the turn-on signal to the chiller, the valve liquid inlet port is closed by the solenoid valve.

4. The cooling method using the water-cooling type battery cooling system of claim 1, wherein before opening the valve liquid inlet port, the internal refrigerant of the liquid pipe discharged from a condenser flows towards the suction pipe connected to a second end of the liquid pipe.

5. The cooling method using the water-cooling type battery cooling system of claim 1, wherein in discharging the internal refrigerant of the liquid pipe to the outside of the chiller via the refrigerant discharge port, the internal refrigerant of the liquid pipe is coalesced with the internal refrigerant of the suction pipe in the chiller and is then discharged to the outside of the chiller.

6. The cooling method using the water-cooling type battery cooling system of claim 1, wherein the internal refrigerant of the liquid pipe discharged to the outside of the chiller flows into a compressor.

7. The cooling method using the water-cooling type battery cooling system of claim 1, wherein the solenoid valve has an orifice aperture formed therein.

8. Cooling method using the water-cooling type battery cooling system of claim 7, wherein the solenoid valve is changed to an opened state when the turn-on signal is transmitted to the chiller and is changed to a closed state when the turn-off signal is transmitted to the chiller.

9. The cooling method using the water-cooling type battery cooling system of claim 1, wherein the chiller includes a partition installed therein to close a space between a chiller suction inlet port and the refrigerant discharge port.

10. The cooling method using the water-cooling type battery cooling system of claim 9, wherein the internal refrigerant of the suction pipe flowing into the chiller via the chiller suction inlet port is circulated in the chiller and heat-exchanged to cool coolant for a battery in the chiller.

11. The cooling method using the water-cooling type battery cooling system of claim 9, wherein the chiller include a coolant inlet port and a coolant outlet port formed therein, wherein when the turn-on signal is transmitted to the chiller, coolant for a battery flows into the coolant inlet port and is discharged from the coolant outlet port.

* * * * *